United States Patent [19]

Tong et al.

[11] Patent Number: 5,346,721

[45] Date of Patent: Sep. 13, 1994

[54] METHOD FOR COATING CRT FACE PANELS

[75] Inventors: Hua-Sou Tong, Arlington Heights; Gregory Prando, Chicago, both of Ill.

[73] Assignee: Zenith Electronics Corporation, Glenview, Ill.

[21] Appl. No.: 882,205

[22] Filed: May 13, 1992

Related U.S. Application Data

[63] Continuation-in-part of Ser. No. 458,127, Dec. 28, 1989, abandoned.

[51] Int. Cl.⁵ .............................................. B05D 5/12
[52] U.S. Cl. ............................. 427/126.2; 427/126.3; 427/167; 427/168; 427/226; 427/421
[58] Field of Search .................... 427/64, 68, 163, 167, 427/168, 126.2, 126.3, 126.5, 226, 421; 313/478, 479

[56] References Cited

U.S. PATENT DOCUMENTS

| | | | |
|---|---|---|---|
| 3,689,312 | 9/1972 | Long et al. | 117/94 |
| 4,563,612 | 1/1986 | Deal et al. | 313/478 |
| 4,785,217 | 11/1988 | Matsuda et al. | 313/479 |
| 4,945,282 | 7/1990 | Kawamura et al. | 313/479 |

OTHER PUBLICATIONS

Webster's Ninth New Collegiate Dictionary, p. 832, 1986.

*Primary Examiner*—Shrive Beck
*Assistant Examiner*—David Maiorana

[57] ABSTRACT

The present invention is directed to a cathode ray tube having a surface with reduced reflectivity and electrical resistivity and to a method for providing such reduced reflectivity and electrical resistivity. In the method of the invention, a solution of a soluble metallic cation moiety and a silane in an organic solvent is provided. The solution is applied to the surface of a cathode ray tube to provide a coating of the silane and the metallic moiety of the metallic compound on the surface. Thereafter, the cathode ray tube is cured at an elevated temperature for a period of time sufficient to convert the metallic cation moiety to a metal oxide in situ and to provide a metallic oxide in a matrix of siloxane.

19 Claims, 1 Drawing Sheet

METHOD FOR COATING CRT FACE PANELS

CROSS-REFERENCE TO RELATED APPLICATION

This application is a Continuation-in-Part of application Ser. No. 458,127 filed Dec. 28, 1989, now abandoned.

FIELD OF THE INVENTION

The present invention relates generally to a cathode ray tube (CRT) having a coating on the face panel thereof, which coating provides antiglare and antistatic properties. More particularly, the present invention relates to a method for providing an antiglare and antistatic coating on the face panel of CRT's.

BACKGROUND OF THE INVENTION

Cathode ray tubes are increasingly being used as visual display terminals (VDT's) which are scanned at close range by the human eye. The higher anode voltages which are required for larger size tubes has resulted in the possibility of increased electric shocks to the human body rising from an electrostatic charge induced by turning the CRT switch on and off. Additionally, static electricity charges cause dust to adhere to the CRT glass surface, resulting in the reduction of brightness and contrast of the CRT screen. Also, it is desirable to minimize the glare that is reflected from the glass surface of the CRT so as to enable the user to more easily read the graphics and other display characters that are shown on the screen.

It is known to reduce the glare and static charge on CRT face panels by applying a double layer of ultra fine tin oxide particles onto the surface of the face panel. The tin oxide particles, having a diameter of about 50 nm, are suspended in a solution of ethyl silicate and ethanol. The suspension of tin oxide particles is coated by a spinner onto the exterior surface of the base plate of the CRT to produce a transparent, electro-conductive layer. The coated surface is heated after the application of the tin oxide layer for about thirty minutes at a temperature in the range of 100° C. to 200° C. Thereafter, a second layer of ultra-fine 50 nm diameter tin oxide particles suspended in a solution of ethyl silicate and ethanol is coated onto the first layer by a spinner to produce a non-glare layer. The CRT tube with the two layers of tin oxide particles are again heated for about thirty minutes at temperatures in the range of 100° C. to 200° C.

Untreated CRT's have a surface resistivity of about $10^{13}$ ohms to about $10^{14}$ ohms. After treatment by the above-described two-step tin oxide process, the CRT surface resistivity is reduced to about $10^7$ ohms. Untreated CRT's have a reflectivity of about 4.9% (at 550 nm). CRT's which have been treated in accordance with the above-described two-step tin oxide coating process have a reflectivity of about 0.5% (at 550 nm).

U.S. Pat. No. 4,563,612 to Deal, et al. describes a cathode ray tube having an antistatic, glare-reducing coating. The coating has a rough surface which is composed essentially of a silicate material and an inorganic metallic compound. The coating is applied by spraying a solution of a water soluble salt of one or more of a metal selected from platinum, tin, palladium and gold in a lithium stabilized silica sol onto the surface of the cathode ray tube. A solution of lithium, sodium and potassium silicate or an organic silicate, such as tetraethyl orthosilicate may be substituted for the lithium stabilized silica sol.

U.S. Pat. No. 3,689,312 to Long, et al. is directed to a method for producing a glare-reducing coating on the surface of a cathode ray tube. The method includes the steps of preparing a coating formulation consisting of a solution of a siliceous polymer and an organic polymer in a volatile organic liquid vehicle for the polymers. The solution is then sprayed onto the surface of a cathode ray tube to coat the surface. The cathode ray tube is then baked at a temperature of 100° C. to 200° C. to cure the coating.

A cathode ray tube having an antistatic film is disclosed in U.S. Pat. No. 4,785,227 to Matsuda, et al. The antistatic film is applied by dipping the cathode ray tube into a mixture of tetraethyl silicate, propanol and butanol containing a colloidal solution of metal particles.

U.S. Pat. No. 4,945,282 to Kawamura is directed to improving the antistatic and antiglare properties of cathode ray tubes. The Kawamura, et al. patent utilizes particles of a metal oxide or a hygroscopic metal salt, in various formats, to provide improvements in antistatic and antiglare properties. See Column 5, lines 2-5 and claim 1 of the Kawamura, et al. patent for a specific teaching of the use of metal oxide and hygroscopic metal salt particles. The present invention utilizes a solution of a metallic compound to provide improved antistatic and antiglare properties and forms a metal oxide in situ on the surface of the cathode ray tube.

As set forth in the Kawamura, et al. patent, it is indicated that the transparent conductive film, particularly in the second embodiment, may be a thin $SiO_2$ film into which a transparent conductive metal oxide particle and/or hygroscopic metal salt particles have been incorporated to impart conductivity. The hygroscopic metal salt particle contained in the thin $SiO_2$ film is preferably a metal salt of group 2 metals, represented by magnesium, and salts of group 3 metals, represented by aluminum. There is no teaching or suggestion in the Kawamura, et al. patent that such salts may be converted to the oxide during a curing step. Instead, the Kawamura, et al. patent indicates that the hygroscopic metal salts absorb moisture from the atmosphere to lower the electric resistance of the panel surface. If an oxide of aluminum or magnesium were to be formed, the metal salts would lose their ability to absorb moisture from the atmosphere and to lower the electric resistance of the panel surface in accordance with the theory of the Kawamura, et al. patent. Indeed, forming an oxide of aluminum or magnesium would be highly unlikely considering the conditions under which the siloxane film is cured in accordance with the Kawamura, et al. patent, i.e., at a temperature of from about 50 to 200° C.

While the two-step (two coating and curing steps) tin oxide coating process described above provides a CRT with improved antiglare and antistatic properties, it would be desirable for reasons of economy and reduced handling, to provide a one-step (one coating and curing step) process wherein antiglare and antistatic properties are similarly improved.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the figures of which like reference numerals identify like elements, and in which:

DESCRIPTION OF THE PREFERRED EMBODIMENT

The invention is useful in cathode ray tubes of various types including home entertainment and medium-resolution and high-resolution types for use in color monitors.

Figure 1:
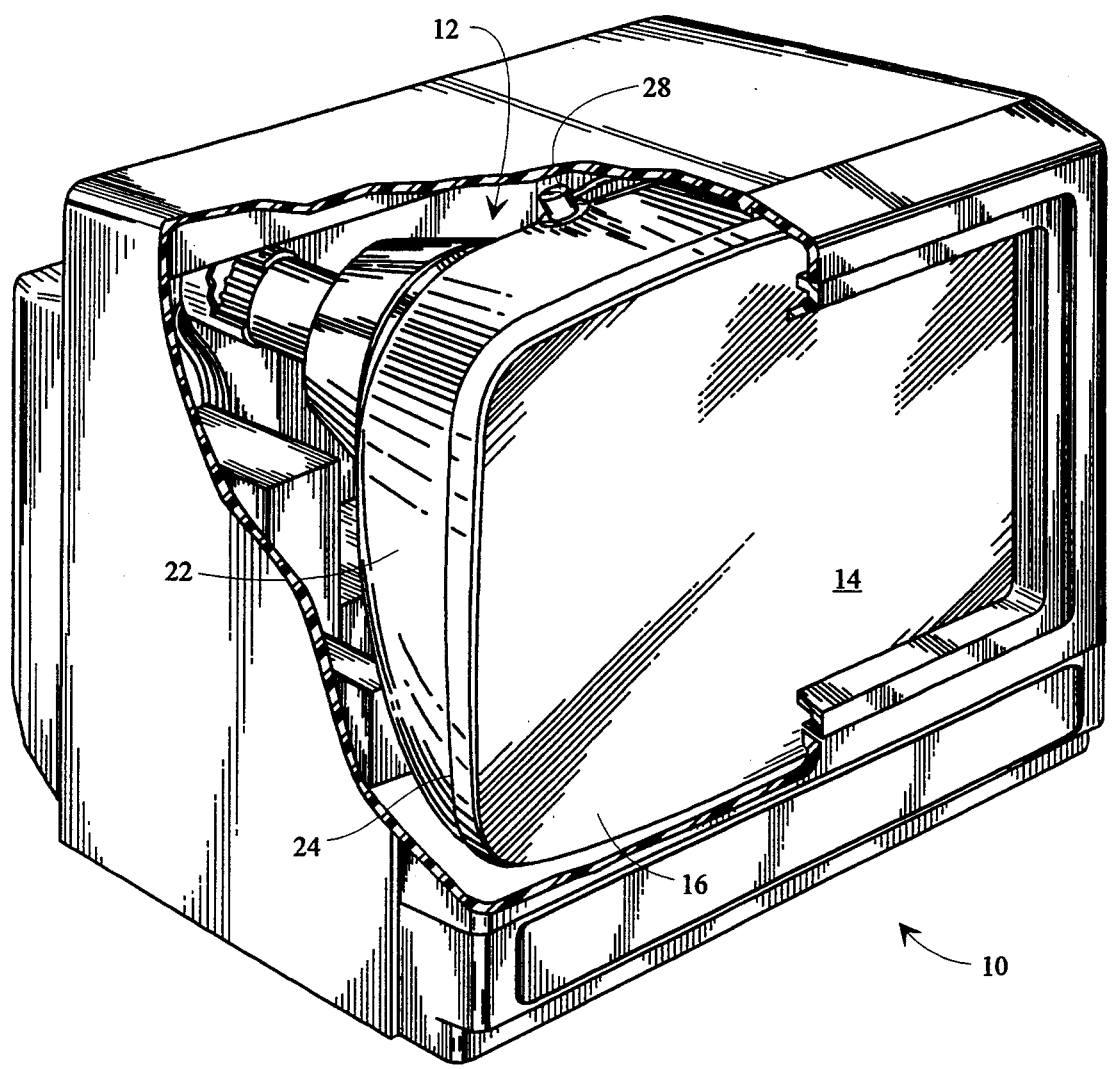
FIG. 1 is a cut-away view in perspective of a cabinet that houses a color cathode ray tube, showing certain components, including a front panel, which are the subject of the present invention.
Figure 2:
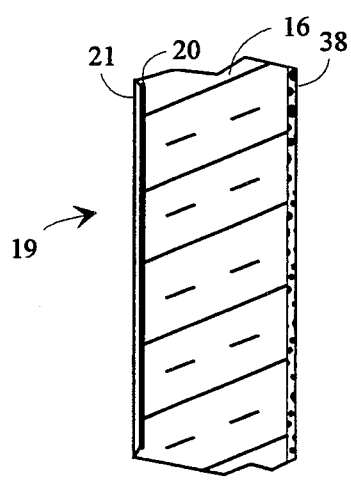
FIG. 2 is a cross-sectional view, broken away, of the front panel of the cathode ray tube of FIG. 1.

FIG. 1 shows a novel video monitor 10 that houses a color cathode ray tube 12 having a front panel assembly according to the invention. The design of the video monitor is the subject of copending Design Patent application Ser. No. 725,040 of common ownership herewith. The monitor, and the associated tube according to the invention, is notable for the flat imaging area 14 that makes possible the display of images in undistorted form. Imaging area 14 also offers a more efficient use of screen area as the corners are relatively square in comparison with the more rounded corners of the conventional cathode ray tube. The front assembly system comprises the components described in the following paragraphs.

A funnel 22 is shown as being attached to a peripheral sealing area 24 on the inner surface of faceplate 16. A high electrical potential is applied through a high voltage conductor (not shown) attached to an anode button 28 which conducts the potential (the source of which is a high voltage power supply) through the wall of the funnel 22. The potential may be in the range of 18 to 32 kilovolts, by way of example.

With reference also to FIG. 1, the imaging area 14 includes a glass faceplate 16 that may be flat, or alternatively, "substantially flat" in that it may have finite horizontal or vertical radii, by way of example. Faceplate 16 is represented as having on its inner surface a centrally disposed electron beam target area 19 on which is disposed at least one pattern of phosphor deposits 20. An electrically conductive screen 21 is depicted schematically as being deposited on and overlaying the pattern of phosphor deposits 20. The electrically conductive screen 21 comprises a film of highly reflective, electrically conductive aluminum disposed on the pattern of phosphor deposits 20 by evaporative means or by hot stamping and having a thickness of about 2000Å. The novel antiglare-antistatic coating 38 of the invention is depicted as having a plurality of microscopic particles of a metal oxide dispersed in a matrix of siloxane.

Generally, in accordance with the present invention, a solution of a metallic compound and a silane in an organic solvent are applied to the surface of a cathode ray tube to provide a coating of the metallic moiety of the metallic compound and the silane on the surface of the cathode ray tube. The metallic compound is selected from the group consisting of organometallic compounds and metal salts. The cathode ray tube with the coating applied is then cured at an elevated temperature to provide a metallic oxide in a matrix of siloxane.

As used herein, the term "solution" refers to a true solution wherein the metallic compound dissociates in the solution to the molecular or ionic level, i.e., into individual atoms. The metallic moiety is present as a metal cation. All atoms, whatever their atomic number have roughly the same diameter (about 1.0Å).

Organometallic compounds are compounds that contain at least one relatively covalent carbon-to-metal bond. The metal may be bonded to an element other than carbon. The preferred metals in the organometallic compounds used in the present invention are selected from the group consisting of tin, palladium, platinum, silver and antimony. Suitable organic moieties for use in providing the organometallic compounds useful in the present invention include acetyl, acetic acid and ethylhexanoic acid. Mixtures of organometallic compounds may be used.

Suitable metal salts are any salt of tin, palladium, platinum, silver and antimony which is soluble in the organic solvent at a level of from about 0.1 percent to about 1.5 percent. All percentages used herein are by weight, unless otherwise indicated. Preferred metal salts are metal halogen salts, such as tin chloride.

The metal compound is preferably present in said solution at a level sufficient to provide from about 0.2% to about 0.6% of the metal moiety of the metal compound in the solution.

Any commercially available silane may be used in the method of the present invention. The silane preferably has a boiling point of less than about 60° C. and is preferably selected from the group consisting of tetralkyl silanes, tetraaryl silanes and halogenated silanes. Suitable silanes include tetrachlorosilane, tetramethoxysilane, tetraethoxysilane and trichlorosilane. The silane is preferably present in the solution at a level of from about 0.5 percent to about 20 percent by weight.

Any organic solvent can be used in which the metallic compound and the silane are soluble. Suitable organic solvents include the aliphatic organic acids and the aliphatic alcohols and mixtures thereof. Preferred solvents are alcohols selected from the group consisting of ethanol, propanol and butanol and organic acids, such as hexanoic acid.

The solution containing metallic cations is applied to the surface of the cathode ray tube by any suitable method, such as by spraying a fine mist of the solution onto the surface. The surface of the cathode ray tube is preferably preheated prior to the application of the solution to evaporate the organic solvent and prevent running of the solution. The surface of the cathode ray tube is preferably preheated to a temperature of from about 70° C. to about 120° C.

A single pass of a spray gun over the surface of the front panel of the cathode ray tube may not result in the application of the desired amount of the solution of a metal compound and the silane. The solution may be applied in multiple layers such as by repeatedly passing a spray gun over the surface of the cathode ray tube. The cathode ray tube is preferably preheated to a temperature in the range of from about 70° C. to about 120° C. prior to the first spray pass and the remaining spray passes are made prior to any substantial cooling of the surface. In an important embodiment of the invention, from about 3 to about 12 spray passes of the solution are applied.

After the solution of the metallic cations and the silane is applied, the cathode ray tube is cured at an elevated temperature for a period of time sufficient to convert the metallic cation in situ to a metal oxide and to provide the metal oxide dispersed in a matrix of siloxane. Suitable temperature and time conditions are a temperature of from about 120° C. to about 200° C. for a period of from about 0.1 hour to about 2 hours. The solution is preferably applied to the surface of the cathode ray tube at a level sufficient to provide from 0.3 to about 1.2 milligrams of the metal oxide per square centimeter of the surface area.

The following examples further illustrate various features of the present invention, but are intended to in no way limit the scope of the invention which is defined in the appended claims.

EXAMPLE 1

A solution of an organometallic compound and a silane was prepared having the following components at the indicated levels.

| Component | Weight Percent |
|---|---|
| Indium acetyl acetonate | 1.0 |
| tin 2-ethylhexanoate | 0.1 |
| Hexanoate acid | 12 |
| Ethanol | 84 |
| Tetrachlorosilane | 2 |

The above solution was sprayed onto the panel surface of a cathode ray tube which had been preheated to a temperature of 90° C. The solvent and the organic moiety of the organometallic compounds were flashed from the surface of the face panel to provide a coating of indium, tin and silane. The cathode ray tube was then cured at a temperature of 175° C. for a period of one hour. The resulting coating was a mixture of tin oxide and indium oxide in a matrix of siloxane. The resistivity of the face panel prior to coating was $10^{14}$ ohm. Electrical resistivity of the face panel with the coating of the invention was $10^9$–$10^{10}$ ohms. The reflectivity of the face panel was 0.4% after the tube had been coated and was 4.0% prior to coating. The gloss reduction of the face panel without coating was 94%. After coating with the coating composition of the invention, the gloss reduction was 45%.

EXAMPLE 2

A solution of tin chloride and a solution of tin 2-ethylhexanoate were prepared having the following components at the indicated levels:

| Component | Weight Percent |
|---|---|
| Tin Chloride Solution | |
| Tin Chloride ($Sn_nCl_2$) | 2.0 |
| Ethanol | 96.0 |
| Tetrachlorosilane | 2.0 |
| Tin 2-Ethylhexanoate Solution | |
| Tin 2-Ethylhexanoate (TEH) | 1.0 |
| Ethanol | 96.0 |
| Tetrachlorosilane | 3.0 |

Multiple layers of the above two solutions were sprayed onto the surfaces of cathode ray tubes which had been preheated to 90° C. The solutions were sprayed in the form of a fine mist from a Binks Model No. 2001 sprayer provided with a 4 mm nozzle orifice. The cathode ray tubes were then cured for 20 minutes at the curing temperatures indicated below in Table 1. The electrical conductivity, resistivity and gloss reduction of each cathode ray tube was then determined to provide the data set forth in Table 1. In Table 1, the column headed "# of sprays" indicates the number of times that the spray gun was passed across the surface of the cathode ray tube.

TABLE 1

| Sample # | # of Sprays | Curing Temp. °C. | Tin Source | Electrical Conductance Ohm/cm | Reflectivity % | Gloss Reduction % |
|---|---|---|---|---|---|---|
| 1001A | 10 | 125 | TEH | $3.1 \times 10^9$ | 0.4 | 34 |
| 1001B | 10 | 125 | TEH | $2.2 \times 10^9$ | | 37 |
| 1001C | 10 | 125 | TEH | $2.2 \times 10^9$ | | 34 |
| 1001D | 10 | 125 | TEH | $5.9 \times 10^9$ | | 39 |
| 1002A | 5 | 125 | TEH | $1.6 \times 10^{10}$ | 0.5 | — |
| 1002B | 4 | 125 | TEH | $2.6 \times 10^{10}$ | | 29 |
| 1002C | 3 | 125 | TEH | $6.6 \times 10^{11}$ | | 30 |
| 1002D | 3 | 125 | TEH | $1.8 \times 10^{10}$ | | 35 |
| 1002A1 | 5 | 400 | TEH | $4.3 \times 10^9$ | | 39 |
| 1003A | 6 | 125 | $Sn_nCl_2$ | $1.6 \times 10^{10}$ | 0.5 | 27 |
| 1003B | 6 | 125 | $Sn_nCl_2$ | $2.4 \times 10^{10}$ | | 26 |
| 1003C | 8 | 125 | $Sn_nCl_2$ | $2.2 \times 10^{10}$ | 0.5 | — |
| 1004A | 6 | 125 | $Sn_nCl_2$ | $1.3 \times 10^9$ | | 45 |
| 1004B | 6 | 125 | $Sn_nCl_2$ | $6.5 \times 10^9$ | | — |
| 1004C | 6 | 125 | $Sn_nCl_2$ | $3.2 \times 10^9$ | | 44 |
| 1005A | 8 | 150 | $Sn_nCl_2$ | $1.2 \times 10^{10}$ | | 59 |
| 1005B | 8 | 150 | $Sn_nCl_2$ | $2.0 \times 10^{10}$ | 0.45 | 49 |
| 1005C | 6 | 150 | $Sn_nCl_2$ | $1.6 \times 10^{10}$ | | 44 |
| 1005D | 6 | 150 | $Sn_nCl_2$ | $1.3 \times 10^{10}$ | | 32 |
| 1005E | 6 | 200 | $Sn_nCl_2$ | $1.6 \times 10^{10}$ | 0.5 | 41 |
| 1006A | 6 | 200 | $Sn_nCl_2$ | $1.3 \times 10^{10}$ | | 46 |
| 1006B | 6 | 250 | $Sn_nCl_2$ | $4.2 \times 10^{10}$ | | 38 |
| 1006C | 6 | 250 | $Sn_nCl_2$ | $4.4 \times 10^{10}$ | | 48 |
| 1007A | 6 | 250 | $Sn_nCl_2$ | $7.8 \times 10^{10}$ | | 46 |
| 1007B | 6 | 250 | $Sn_nCl_2$ | $2.3 \times 10^{10}$ | 0.5 | 37 |
| 1007C | 6 | 250 | $Sn_nCl_2$ | $1.0 \times 10^{10}$ | | 30 |
| 1008A | 6 | 300 | $Sn_nCl_2$ | $7.0 \times 10^9$ | 0.5 | 32 |
| 100B | 6 | 300 | $Sn_nCl_2$ | $3.4 \times 10^9$ | | 40 |
| 100BC | 6 | 300 | $Sn_nCl_2$ | $4.7 \times 10^9$ | | |

What is claimed is:

1. A method for reducing both the reflectivity and the electrical resistivity of the surface of a cathode ray tube comprising:

(a) providing an ionic solution consisting essentially of a dissociated metallic compound having a metallic cation moiety selected from the group consisting of tin, palladium, platinum, silver and antimony and a silane in an organic solvent, (b) applying said solution on the surface of a cathode ray tube to provide a coating of said silane and said metallic cation moiety on said surface, and (c) curing said cathode ray tube at an elevated temperature of from about 120° C. to about 200° C. for a period of from about 0.1 hour to about 2 hours to convert said metallic cation moiety to a metal oxide in situ and to provide a transparent coating of an oxide of said metallic moiety dispersed in a matrix of siloxane on the surface of said cathode ray tube.

2. A method in accordance with claim 1 wherein said metallic compound is selected from the group consisting of organometallic compounds and metal salts.

3. A method in accordance with claim 1 wherein said surface of said cathode ray tube is preheated prior to application of said solution.

4. A method in accordance with claim 3 wherein said cathode ray tube is preheated to a temperature in the range of from about 70° C. to about 120° C. prior to applying said solution.

5. A method in accordance with claim 1 wherein said curing of said cathode ray tube is at an elevated temperature of from about 120° C. to about 200° C. for a period of from about 0.1 hour to about 2 hours.

6. A method in accordance with claim 1 wherein said metallic oxide in said coating is present at a level of from about 0.3 to about 1.2 milligrams per square centimeter of said surface area of said cathode ray tube.

7. A method in accordance with claim 1 wherein said solution is applied by spraying a fine mist of said solution onto said surface.

8. A method in accordance with claim 1 wherein said solution is applied to said surface of said cathode ray tube by multiple spray passes.

9. A method in accordance with claim 8 wherein from 3 to 12 spray passes are used to apply said solution.

10. A method in accordance with claim 2 wherein said metallic compound is a metal salt.

11. A method in accordance with claim 10 wherein said metal salt is a halogen salt of a metal selected from the group consisting of tin, palladium, platinum, silver and antimony.

12. A method in accordance with claim 11 wherein said metal is tin.

13. A method in accordance with claim 11 wherein said metal salt is tin chloride.

14. A method in accordance with claim 2 wherein said metal compound is an organometallic.

15. A method in accordance with claim 14 wherein the metal moiety of said organometallic is selected from the group consisting of tin, palladium, platinum, silver and antimony.

16. A method in accordance with claim 1 wherein said metal compound is present in said solution at a level sufficient to provide from about 0.2 percent to about 0.6 percent of the metal moiety of said metal compound in said solution.

17. A method in accordance with claim 1 wherein said silane is selected from the group consisting of tetraalkyl silanes, tetraaryl silanes and halogenated silanes.

18. A method in accordance with claim 16 wherein said silane is selected from the group consisting of tetrachlorosilane, trichlorosilane, tetramethoxy silane and tetraethoxy silane.

19. A method in accordance with claim 1 wherein said silane is present in said solution at a level of from about 0.5% to about 20% by weight.

* * * * *